United States Patent [19]

Armstrong

[11] Patent Number: 4,558,317
[45] Date of Patent: Dec. 10, 1985

[54] DIGITAL COMMUNICATION LINK MONITORING DEVICE

[75] Inventor: Thomas R. Armstrong, Clearwater, Fla.

[73] Assignee: Paradyne Corporation, Largo, Fla.

[21] Appl. No.: 442,317

[22] Filed: Nov. 17, 1982

[51] Int. Cl.⁴ .......................... H04Q 9/00; H04J 3/02; G06F 11/00
[52] U.S. Cl. .................................. 340/825.06; 370/13
[58] Field of Search ...................... 340/825.06; 371/47, 371/24, 55, 27, 61, 22; 370/13, 17, 43, 77, 84; 375/10, 118, 113; 178/69 R, 69 G

[56] References Cited

U.S. PATENT DOCUMENTS

| | | | |
|---|---|---|---|
| 4,271,506 | 6/1981 | Broc et al. | 370/13 |
| 4,271,513 | 6/1981 | Maejim et al. | 371/22 |
| 4,273,955 | 6/1981 | Armstrong | 178/69 G |
| 4,279,032 | 7/1981 | Smith | 370/17 |
| 4,351,059 | 9/1982 | Gregoire et al. | 371/22 |
| 4,397,020 | 8/1983 | Howson | 370/13 |

Primary Examiner—Donald J. Yusko
Attorney, Agent, or Firm—Kane, Dalsimer, Kane, Sullivan & Kurucz

[57] ABSTRACT

Digital transmission service offerings provided by common carriers are characterized by digital terminations at two or more user locations. The user has access only to the digital clock and data signals. A modem is described which when attached to the digital terminations provides three functions. First it allows the user to pass his data over the digital service channel. Second it measures the digital communication error rate and availability. Third it permits the user to pass a low speed telemetry channel over the digital service in addition to normal user data. The modem measures the digital channel bit error rate and provides a secondary or side channel without interfering with the transmission of normal data.

8 Claims, 8 Drawing Figures

DIGITAL MONITOR UNIT FUNCTIONAL BLOCK DIAGRAM

DIGITAL MONITOR UNIT FUNCTIONAL BLOCK DIAGRAM

DIGITAL COMMUNICATION LINK MONITORING DEVICE

BACKGROUND OF THE INVENTION

This invention relates to data communications and, in particular, to a device which extends data communications system performance analysis to those systems which may be described as digital systems.

Specifically, digital systems are defined to be those data communication services in which the customer or user has only access to the digital clock and data signals at the communication channel terminations. A typical digital service offering is the Digital Datas System (DDS) offered by American Telephone and Telegraph which is discussed in the following publications: "Digital Data System-Channel Interface Specifications-Addendum" PUB441021A, October, 1981, and "DATAPHONE Digital Service-Preliminary-", PUB441022, September 1974, and "DATAPHONE Switched Digital Service-Channel Interface Specifications-Preliminary-", PUB41023 by the American Telephone and Telegraph Company.

In my commonly assigned U.S. Pat. No. 4,273,955, issued June 16,1981, a network management and control system is described. This system was designed to utilize analog communication media such as telephone channels. The digital data signaling over such channels being accomplished by the use of wireline modems, one modem being located at each analog telephone channel termination. In particular, diagnostic telemetry data was conveyed through the system using the Frequency Division Multiplexing techniques described in my U.S. Pat. No. 4,273,955.

When digital data transmission services are utilized, no excess bandwith is available for diagnostic telemetry transmission and the technique of FDM is not feasable. Some method of time division multiplexing (TDM) must be utilized.

In view of the above, it is the principal object of the present invention to provide a system whereby the monitoring of components of a multilocation digital data communications network may be attained from a central location.

A further object is to provide a system which permits both diagnostic telemetry and test or probe data sequences to be imbedded in user data for transmission over the digital data communication channels.

Other objects and advantages will be apparent from a review of the detailed description of a preferred embodiment of the invention.

SUMMARY OF THE INVENTION

The above and other beneficial objects and advantages are attained in accordance with the present invention by providing a data communications network comprising a digital data transmission service which links at least two remote locations, each of which contains data terminal equipment which interfaces to and communicates with its counterpart via the digital transmission service.

Digital monitor units are inserted at each location between and interfaced to the data terminal equipment and digital data service termination unit. Optionally, a central controller at either location may be interfaced to the digital monitor unit.

The digital monitor units at either end of the digital data transmission service equipment perform several important functions. Each digital monitor unit communicates with its counterpart by means of two digital data streams. One data stream is a probe or test data sequence for the purpose of measuring the bit error rate through the digital transmission service and also for the purpose of synchronization as discussed below. The second data stream allows each digital monitor unit to exchange service messages, data or commands with its counterpart or with the optional remotely located central controller.

The two diagnostic or test data streams are typically at a much lower bit rate than that provided by the digital transmission service thereby resulting in minimal degradation in the nominal bit rate between the aforementioned customer data terminal equipment. The two inserted data streams are time division multiplexed with the data terminal data streams before input to the digital transmission service interface units.

By means of an example, suppose this digital transmission service provides the user a capacity of 56000 bits per second (bps). The digital monitor units would then transmit a test data sequence at 110.234 bps and would transmit supervisory data at 110.234 bps thereby consuming a total transmission rate of 220.470 bps. The user data terminal equipments would then be allotted the remaining capacity of 55779.53 bps. Hence the user would lose only 0.4% of the available digital transmission service capacity. Time division multiplexing the 220.35 bps and 55779.53 bps data streams together to yield a 56000 bps data stream can be accomplished by allocating 1 in every 254 bits to the low speed data stream and 253 in every 254 bits to the 55779.53 bps data stream.

The operation of the performance monitoring system and aforementioned central controller is similar to that discussed in my U.S. Pat. No. 4,273,955 with the exception that in this application the transmission media as observed by the user is digital as opposed to analog.

DETAILED DESCRIPTION OF THE PREFERRED EMBODIMENT

Figure 1:
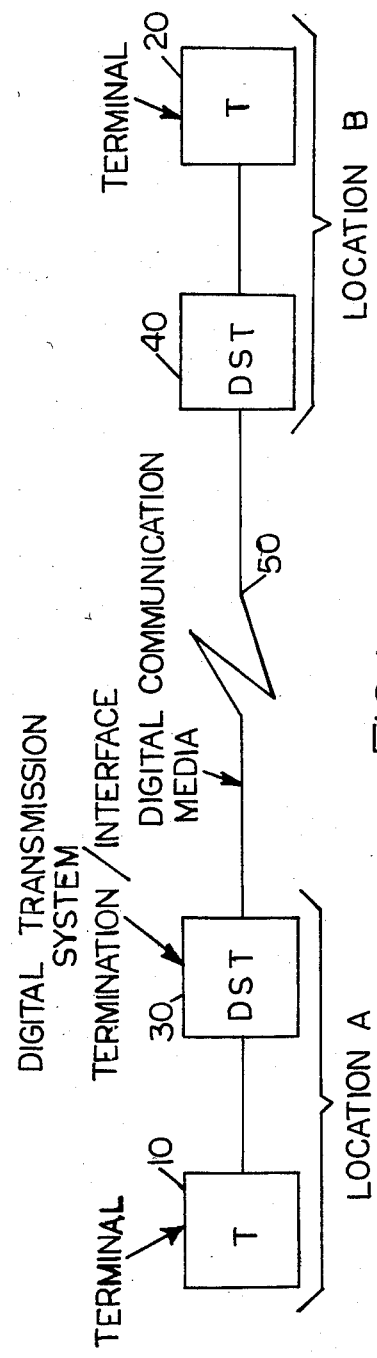
FIG. 1 shows the components of a standard data transmission system.

Reference is now made to the drawings and to FIG. 1 in particular, where a functional diagram of a simplified Digital Data Transmission System (DDTS) is depicted. Such a typical digital transmission service which is in common use is the Dataphone Digital Service (DDS) offered by American Telephone and Telegraph (Bell)

As depicted in FIG. 1, two data terminal equipment or user terminals T,10 and 20 at locations A and B respectively are interconnected by a DDTS. This DDTS is characterized by Digital Systems Terminations (DST) 30 and 40 or interfaces between the actual digital transmission media 50 and the terminal or user electrical interface. The digital communications media may be composed of fiber optic cable, coaxial cable, microwave, radio twisted pair copper cable or most likely some combination of the above.

The DST functionally interfaces the digital communications media clock and data signals with the user terminal. Specifically, it changes the form of the clock and data as employed on the communication media into a form compatible with the terminal. For example, on many DDTS the internal clock and data are conveyed by means of differential Manchester binary signalling while user terminals usually require separate clock and data to be conveyed in RS-232 voltage levels. The DST, therefore, in this case, performs the balanced NRZ to RS-232 conversion. Typical DST's are the model GSU-500B provided by General DataCom Company or the DSU-500B provided by AT & T for use in conjunction with Dataphone Digital Service.

The differential Manchester binary signalling mechanism combines data and clock into "bit symbols". Each bit symbol is split in two halves with the second half containing the binary inverse of the first half; a transition always occurs in the middle of each bit symbol. A MARK is encoded as the inverse of the previous bit symbol, thereby generating a transition only at the center of the bit-symbol.

Recovery of timing implicit in the data is easily accomplished at the receiving side of the interface because of the wealth of binary transitions guaranteed to be in the encoded waveform, independent of the data sequence. Furthermore, it is possible to sense the signalling speed at the receiving device because the relative positions of transitions are consistent for only one speed (assuming the presence of both MARK and SPACE symbols.)

The actual terminals employed has no influence on the described invention. They may be actual user terminals such as IBM models 3274o4 3271, host processors such as manufactured by Prime, Tandem or DEC or front end processors such as manufactured by IBM. Indeed the connectivity employed may be multipoint as opposed to point-to-point.

Figure 2:
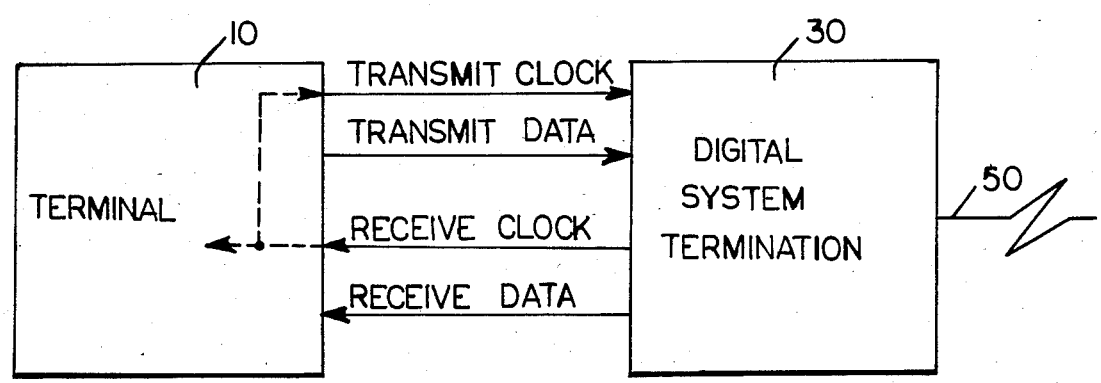
FIG. 2 shows the flow of signals between a data terminal and its interface with the communication line.

Of particular importance is the actual electrical interface between the DST and the terminal. As shown in FIG. 2, the electrical interface is composed only of clock and data signals in contrast to the widely used EIA/CCITT Modem-Terminal Interface which also contains numerous control signals such as data terminal ready, request to send, data carrier detect, etc. The actual electrical voltage levels usually follow standard RS-232 or V.35. As shown in FIG. 2, a requirement of the DDTS is that the terminal 10 loop back the receive clock as the transmit clock into the DST 30. This is necessary since the DDTS generates all clock signals internally. Worthy of note is the fact that this requirement greatly simplifies the design of the invention since it omits any requirement for data buffers within the invention.

Figure 3:
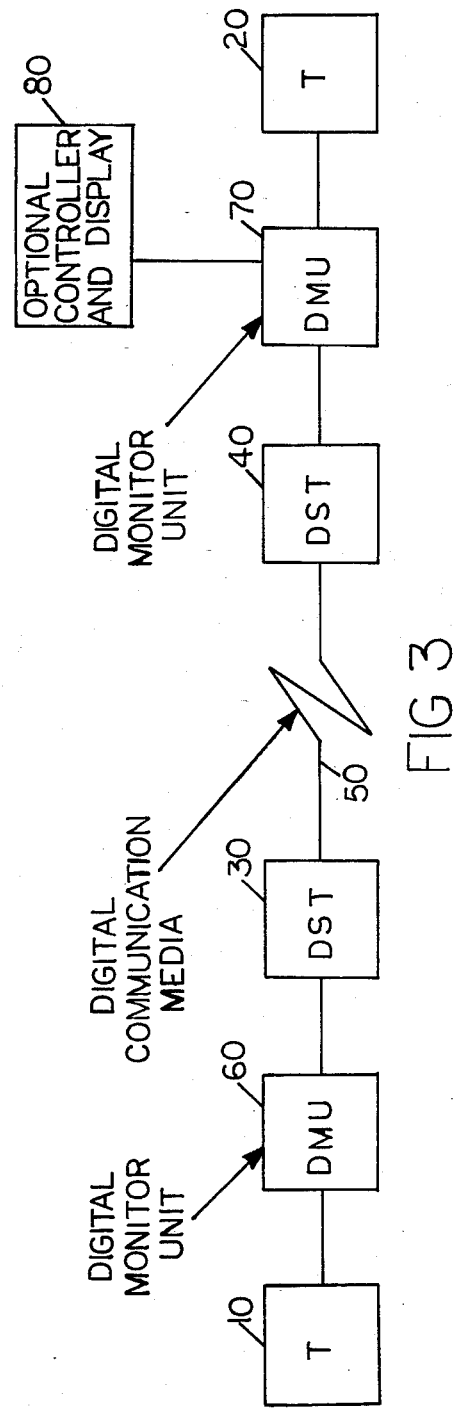
FIG. 3 shows a digital communication as modified by this invention.

According to this invention, two Digital Monitor Units (DMU) 60 and 70 are introduced in the previously described communication system, as shown in FIG. 3. They are placed between the DDTS DST 30 and 40 and terminals 10 and 20 respectively in series with the transmit and receive clock and data signals of FIG. 2. It is important to note that the clock and data signals are not simply passed through the DMU but rather the DMU modifies both the clock and data signals as will be described below.

An optional control and display unit 80 may be employed in the system as shown in FIG. 3. The purpose of this control and display is to control the DMU test modes and also to display the results of DMU tests such as DMU self-test, DMU to DMU bit error rate test, DMU loopback or terminal loopback. The exact implementation of this control and display unit is more fully described in my U.S. Pat. No. 4,273,955 which is incorporated herein by reference.

Figure 4:
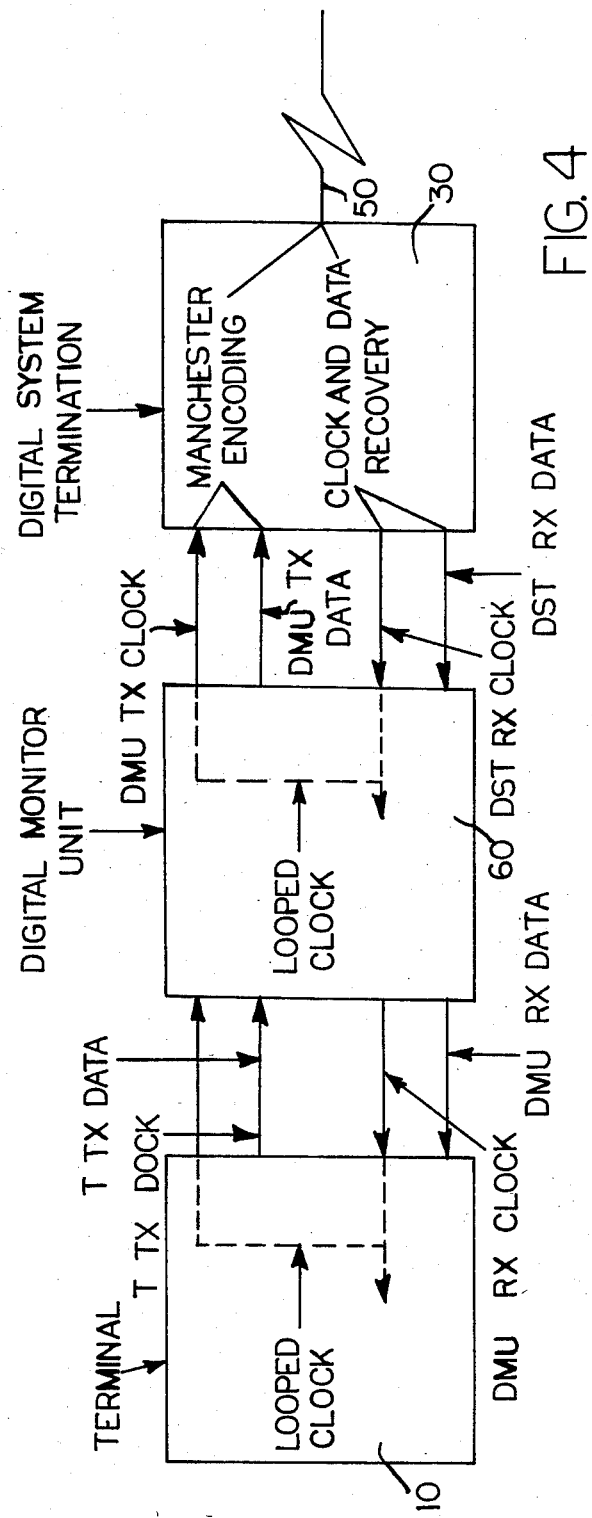
FIG. 4 shows the flow of signals between the data terminal equipment, the digital monitor unit, and the interface.

The required electrical clock and data connections between DST 30 and DMU 60 and between DMU 60 and the terminal 70 are illustrated in FIG. 4. The DST receives clock and data in, for example, Manchester encoded form from the digital backbone or "digital" channel 50. It then recovers clock and separates receive clock and data as previously discussed. The separated receive clock and data signals are then sent to the DMU.

As will be discussed below, the DMU removes embedded telemetry or diagnostic data from the DST receive data, regenerates a lower rate clock and then passes user data to the terminal by means of the regenerated clock.

In a similar manner in the transmit mode the DMU receives terminal transmit clock and data from the terminal. DMU telemetry data is then time-multiplexed into the terminal data stream and the new data stream is then clocked into the DST by means of a higher rate clock. Note that in most cases the transmit clock in FIG. 4 must be equal in rate to the respective receive clock.

Figure 5:
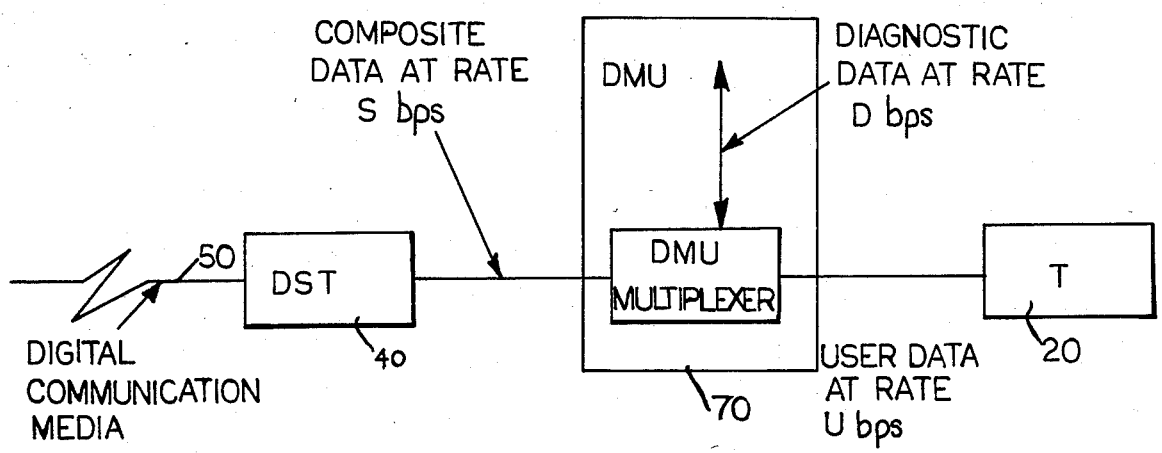
FIG. 5 shows the relationship between the different data rates of the system.

The relation of system clock and data rates between the various system components is best explained by reference to FIG. 5. Between DSU 40 and DMU 70 the data rate is defined to be S bps and between the DMU and the terminal rate is U bps. If U is constrained by DMU design to be less than S then:

$$S - U = D$$

where the rate D bps is then available for diagnostic or telemetry date between the DMU's. Typical numbers for the above data rates are:
 S=56000 bps
 U=55779.53 bps
 D=220.47 bps
for 56000 bps digital service or:
 S=1.544 Mbps
 R=1.536 Mbps
 D=8000 bps
for T1 digital service.

Figure 6:
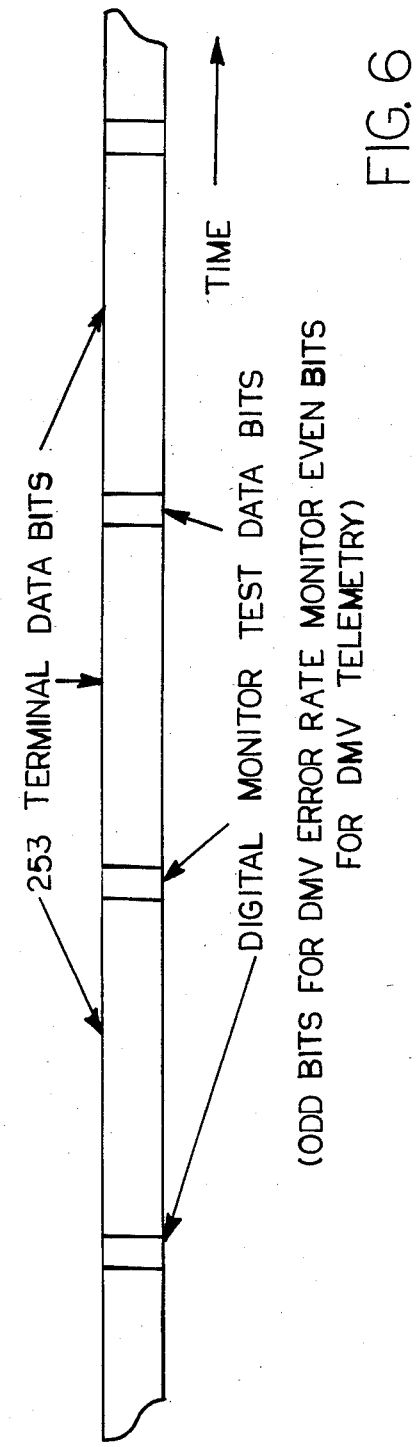
FIG. 6 shows the digital monitor data time-multiplexed with the user data.

The actual insertion and recovery of DMU telemetry data is accomplished by means of the well known technique of time division multiplexing as illustrated in FIG. 6. Using the numbers:
 S=56000 bps
 U=55779.53 bps
 D=220.47 bps
for example, a telemetry data bit is inserted in the transmit data stream between every 253 terminal transmit data bits. Numerically, if the terminal data rate—as determined by the clock from the DMU to terminal—is constrained to be 55779.53 bps then the composite data rate S is given by:

$$S = U \times (254/253)$$

or $$S = U \times 1.003952569$$

or $$S = 56000$$

The clock from terminal 20, as determined by the clock to the terminal, is constrained to be 55779.53 Hz and the clock into the DST 40 is 56000 Hz.

De-multiplexing of the terminal and telemetry data is accomplished in a similar manner. However, in order to perform this function, frame synchronization to determine the location of the telemetry data within the total data sequence must be performed. Synchronization may be readily accomplished by constraining every other inserted telemetry bit in the transmit data stream to be a synchronization sequence. One simple synchronization sequence is dotting or alternating MARK-SPACE sequence.

Figure 7:
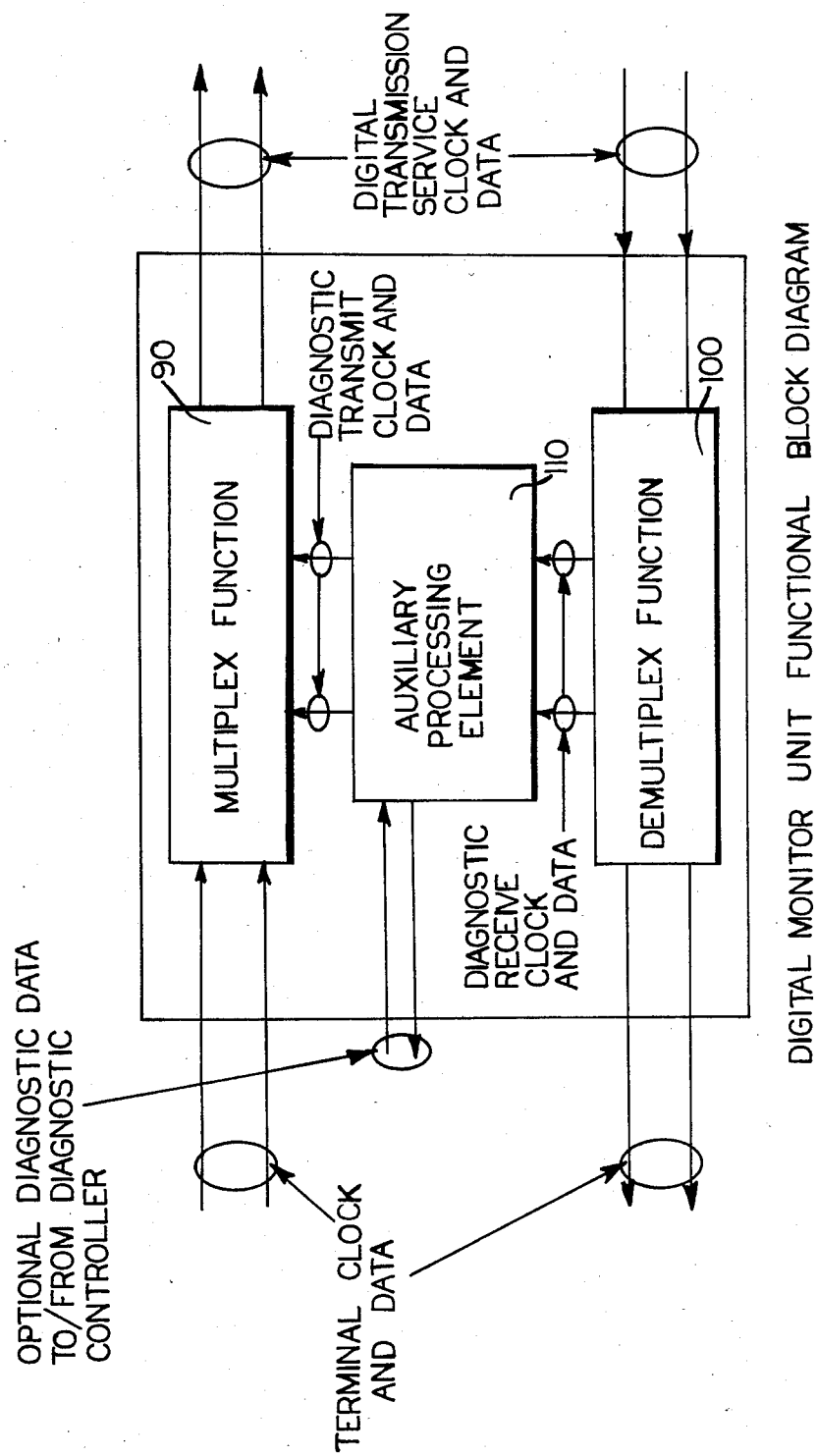
FIG. 7 shows the components of the digital monitor unit.

This synchronization sequence is also utilized as a probe sequence for computing an estimate of the digital channel bit error rate once the received, composite data sequence has been synchronized. A functional block diagram of the DMU is given in FIG. 7. In addition to the multiplexing and de-multiplexing functions indicated by numerals 90 and 100 respectively, the DMU contains an auxilliary processing element 110. The functions of this element are DMU self-tests, DMU to DMU bit error rate computation, DMU loopback control, communication with the optional control and display unit etc. The implementation and function of the auxilliary processing element 110 are presented in detail in my commonly assigned corresponding patent application Ser. No. 376,741, filed May 10, 1982, U.S. Pat. No. 4,516,216, entitled "In-Service Monitoring System for Data Communications Network" and in above mentioned U.S. Pat. No. 4,273,955.

Figure 8:
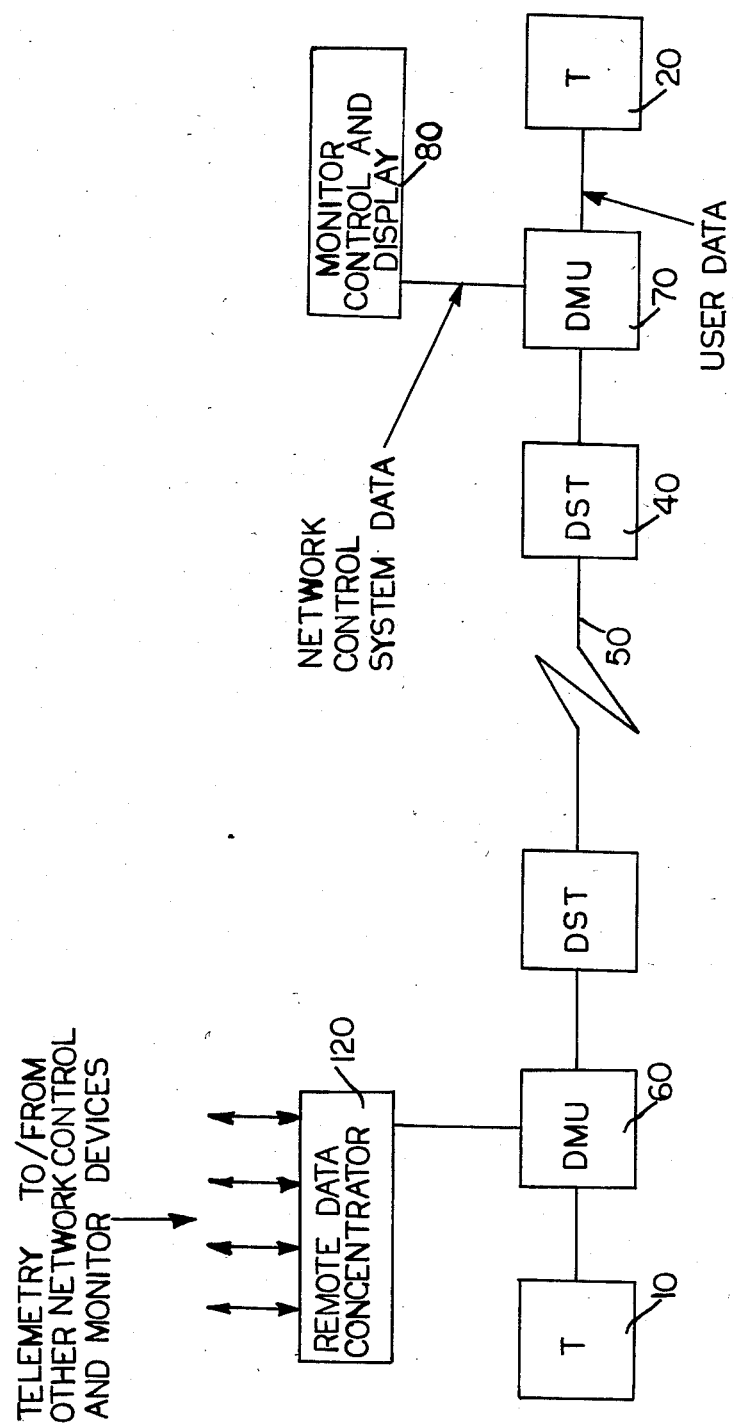
FIG. 8 shows some of the optional equipment which can be connected to the digital monitor unit.

The embedded diagnostic data stream at rate D/2 may also be used for intradiagnostic system communications as illustrated in FIG. 8. As shown, the embedded D/2 data stream may be utilized for communications between the optional control and display unit 80 and a remote diagnostic data concentrator 20.

A detailed description as to the explicit use and protocol on the remaining ½ of the diagnostic data stream at rate D/2 is presented in abovementioned U.S. Pat. No. 4,273,955. Thus, in accordance with the above, the aforementioned objectives are effectively attained.

One skilled in the art may make numerous modifications to this invention without departing from its scope as defined in the appended claims.

I claim:

1. A digital data communication system comprising:
    data terminal equipment provided at several locations;
    a digital data communication media interconnecting said locations and adapted to carry digital data signals;
    interfacing means provided between said data terminal equipment and said communication media; and
    digital monitor units provided at said several locations and
    connected between said interfacing means and said data terminal equipment, said digital monitor units being adapted to exchange monitoring data.

2. The system of claim 1 wherein said data terminal equipment at different locations exchange data streams and wherein said monitoring data is embedded in said data stream.

3. The system of claim 2 wherein said monitoring data comprises test signals, error rate data, and communication channel arbitrary data.

4. The system of claim 3 wherein said digital monitoring unit comprises an auxiliary processing element provided to calculate said error rate data corresponding to the test signals received from another digital monitoring unit.

5. The system of claim 4 wherein said auxiliary processing element is adapted to measure the performance of said communication media, and wherein said monitoring data further comprises said measurement.

6. The system of claim 5 further comprising a monitor and display means connected to at least one of said digital monitoring units for supervising said units.

7. The system of claim 2 wherein the rate of monitoring data is lower than the rate of data generated by said terminal equipment.

8. The system of claim 7 wherein said digital monitoring unit receives a first clock signal from the interfacing means corresponding to the transmitted rate of said interfacing means and wherein said digital monitoring means provides a second clock signal to said digital terminal equipment corresponding to the data rate transmitted by the digital terminal to said monitor unit, said first clock signal having a higher frequency than said second clock signal.

* * * * *